US007739900B2

(12) United States Patent
Reinert et al.

(10) Patent No.: US 7,739,900 B2
(45) Date of Patent: Jun. 22, 2010

(54) METHOD FOR TESTING THE LEAKAGE RATE OF VACUUM ENCAPSULATED DEVICES

(75) Inventors: Wolfgang Reinert, Neumuenster (DE); Dirk Kaehler, Itzehoe (DE); Peter Merz, Beldorf (DE)

(73) Assignee: Fraunhofer-Gesellschaft zur Foederung der Angewandten Forschung E.V., Munich (DE)

( * ) Notice: Subject to any disclaimer, the term of this patent is extended or adjusted under 35 U.S.C. 154(b) by 182 days.

(21) Appl. No.: 11/792,074

(22) PCT Filed: Nov. 10, 2005

(86) PCT No.: PCT/EP2005/055890

§ 371 (c)(1),
(2), (4) Date: Jun. 1, 2007

(87) PCT Pub. No.: WO2006/061302

PCT Pub. Date: Jun. 15, 2006

(65) Prior Publication Data

US 2008/0141759 A1    Jun. 19, 2008

(30) Foreign Application Priority Data

Dec. 7, 2004   (EP) ................... 04028993

(51) Int. Cl.
*G01M 3/02* (2006.01)
(52) U.S. Cl. .......................... 73/40.7; 73/49.3
(58) Field of Classification Search ............. 73/40.7, 73/49.3
See application file for complete search history.

(56) References Cited

U.S. PATENT DOCUMENTS

| 3,070,992 | A |   | 1/1963 | Nemeth |   |
|---|---|---|---|---|---|
| 3,227,872 | A |   | 1/1966 | Nemeth |   |
| 4,080,822 | A |   | 3/1978 | Stenback |   |
| 4,608,866 | A | * | 9/1986 | Bergquist | 73/40.7 |
| 4,785,666 | A | * | 11/1988 | Bergquist | 73/40.7 |
| 5,317,900 | A | * | 6/1994 | Bergquist | 73/40.7 |
| 7,210,337 | B1 | * | 5/2007 | Jarrett | 73/49.3 |
| 2005/0250238 | A1 | * | 11/2005 | Ouellet | 438/53 |

OTHER PUBLICATIONS

Ramesham, R., "Getters for Reliable Hermetic Packages", JPL Publication D-17920, Oct. 18, 1999, pp. 1-89.*
Pamidighantam, S., "Transient Characteristics of BCB Encapsulated Surface Micromachined Aluminum Micro-Mechanical Resonators", 2004 Electronics Packaging Tecnology Conference, 2004, pp. 177-182.*
W. Reinert; "Long term stability of vacuum-encapsulated MEMS devices using eutectic wafer bonding"; Vabond Project Deliverable Report; Mar. 2004; pp. 1-26.

(Continued)

*Primary Examiner*—Daniel S Larkin
(74) *Attorney, Agent, or Firm*—Arent Fox LLP.

(57) ABSTRACT

The present invention is directed to a method for testing the leakage rate of an encapsulated device comprising the step: bombing the device with a neon and/or argon atmosphere using a bombing pressure of at least more than environmental pressure and measuring the quality factor before and after bombing. Preferably, the bombing time is about 10 to 100 hours, and the bombing pressure is 1.5 to 100 bar, more preferably 1.5 to 5 bar and most preferably about 4 bar. With this test, the leakage rate of fine leaks of the device may be determined.

20 Claims, 4 Drawing Sheets

OTHER PUBLICATIONS

K.Y. Yasumura, et al.; "Quality Factors in Micron-and Submicron-Thick Cantilevers"; Journal of Microelectromechanical Systems; vol. 9, No. 1, Mar. 2000; pp. 117-125.

Maenaka, et al; "Analysis of a Highly Sensitive Silicon Gyroscope with Cantilever Beam as Vibrating Mass"; Sensors and Actuators; vol. 54, No. 1-3, Jun. 1996; pp. 568-573.

Sparks, et al; "Reliable Vacuum Packaging Using NanoGetters and Glass Frit Bonding"; Proceedings of the Spie; vol. 5343, No. 1, 2003; pp. 70-78.

M. Bartek, et al.; "Vacumm Sealing of Microcavities Using Metal Evaporation"; Sensors and Actuators; vol. 61, No. 1-3; Jun. 1997; pp. 364-368.

D. R. Sparks, et al.; "Chip-Level Vacuum Packaging of Micromachines Using NanoGetters"; vol. 26, No. 3; Aug. 3, 2003; pp. 277-282.

T. Itoh, et al.; "Room Temperature Vacuum Sealing Using Surface Activated Bonding Method"; Transducers, Solid-State Sensors, Actuators and Microsystems; vol. 2, Jun. 9, 2003, pp. 1828-1831.

B. Lee, et al.; "A Study on Wafer Level Vacuum Packaging for MEMS Devices"; A Study on Wafer Level Vacuum Packaging for MEMS Devices; Journal of Micromechanics & Microengineering, Institute of Physics Publishing; vol. 13, No. 5; Sep. 5, 2003; pp. 663-669.

Berg, Steffen et al., "Nonlinearities in contact mechanics experiments with quartz crystal resonators"; Surface Science 541 (2003) 225-233; Elsevier B.V.

Reinert, W.: Vortrag für Hamburger Lötzirkel; Fraunhofer ISIT, Itzehoe, Jun. 14, 2005.

W. Reinert et al., "Vacuum Wafer Bonding Technology", IMAPS Nordic 2004, Sep. 26-28, 2004.

M. Nese et al., "New method for testing hermeticity of silicon structures", Sensors and Actuators A, 1996, vol. 53, p. 349-352.

Wolgang Reinert et al., "In-Line critical leak rate testing of vacuum-sealed and backfilled resonating MEMS devices", 8$^{th}$ international symposium on semiconductor wafer bonding, May 15-20, 2005, p. 1-6.

M. Amiotti et al., 2004 IEEE International Ultrasonics, Ferroelectrics and Frequency Control Joint 50$^{th}$ Anniversary Conference "Development of Thin Film Getters for Assuring High . . . ", p. 678-681.

W. Reinert, et al., Electronics Packaging Technology Conference "Assessment of Vacuum Lifetime in nL-Packages", 2005, p. 225-230.

* cited by examiner

1. Permeation
2. Leakage
3. Desorption

METHOD FOR TESTING THE LEAKAGE RATE OF VACUUM ENCAPSULATED DEVICES

This application is a 371 of PCT/EP2005/055890 filed Nov. 10, 2005, now WO 2006/061302 with international publication date Jun. 15, 2006, which is hereby incorporated by reference.

This application claims priority to European application 04028993.6 filed Dec. 7, 2004, the entirety of which is hereby incorporated by reference.

BACKGROUND OF THE INVENTION

Vacuum wafer bonding technology provides a number of very effective techniques to produce low-cost, hermetically sealed packages for micromachined sensors and actuators. Besides the protection of the device from outside environmental stresses, the package must also provide a cavity ambient compatible with the device performance and reliability. This invention is directed to remove or alleviate the shortcomings of existing fine leak tests to assess the stability of the cavity atmosphere over long time. A new ultra-fine leak test based on quality factor (Q-factor) monitoring has been developed that has the potential to be used for in-line critical leak rate testing on wafer level before or after device singulation. With the example of a poly-silicon resonating microsensor, it is shown that the test is sensitive enough to predict the cavity pressure for a demanded device lifetime of fifteen years, independent of whether or not an integrated thin film getter is used for stabilizing the cavity vacuum and extending device lifetime.

Microsensor packaging is one of the most important and challenging technology areas (W. Reinert et al., "Vacuum Wafer Bonding Technology", IMAPS Nordic 2004). In particular, hermetic packaging on wafer level is a key technology of many microelectromechanical systems (MEMS). The hermetic sealing protects them from harmful environmental influences, significantly increasing their reliability and lifetime. In addition some MEMS need a specific gas or pressure environment for damping of the resonating structure within the package to function as specified, see table 1. A number of technological topics are to be considered to produce hermetically sealed, micromachined devices on wafer level with controlled cavity pressures ("vacuum pressures") ranging from $10^{-4}$ mbar to 1000 mbar.

TABLE 1

Required vacuum level for different MEMS.

| sensor/device type | vacuum level |
| --- | --- |
| accelerometer | 300-700 mbar |
| absolute pressure sensor | 1-10 mbar |
| resonator (angular rate) | $10^{-1}$ mbar |
| bolometer | $<10^{-4}$ mbar |
| RF-switch | $<10^{-4}$ mbar |

Wafer-level processes are particularly interesting for the MEMS packaging since they can reduce the fabrication costs and open up possibilities for batch processing. Various wafer level sealing technologies may be used, including wafer bonding, cavity sealing by thin-film deposition, and reactive sealing, see table 2.

TABLE 2

Vacuum wafer level sealing technologies.

| Sealing technology | characteristics |
| --- | --- |
| Wafer bonding | Established, effective technologies |
|  | Large cavity volume |
|  | Damping atmosphere control |
|  | Getter integration possible |
|  | Robust cap withstands molding |
|  | Limited device density on wafer |
| Thin film capping | Very high device density |
|  | No getter integration possible |
|  | Very small cavity volume |
|  | No atmosphere control |
|  | Cap may bend under molding press. |
| Cap transfer | Not an established technology |
|  | Damping atmosphere control |
|  | Getter integration possible |
|  | Parallel process |
|  | Thin caps reduce device thickness |
| Individual capping | Very large cavity volume possible |
|  | Ceramic caps for RF applications |
|  | Sequential placement process |
|  | Getter integration possible |

SUMMARY OF THE INVENTION

The present invention is directed to a method for testing the leakage rate of an encapsulated device comprising the step: bombing the device with a neon and/or argon atmosphere using a bombing pressure of at least more than environmental pressure and measuring the quality factor before and after bombing. Preferably, the bombing time is about 10 to 100 hours, and the bombing pressure is 1.5 to 100 bar, more preferably 1.5 to 5 bar and most preferably about 4 bar. With this test, the leakage rate of fine leaks of the device may be determined. This test is helpful in determining statistical surface contaminations or defects caused by wafer processing that affect the seal integrity just enough to cause shorter lifetimes. Further, dicing, die assembly and transfer molding may also introduce physical defects which may be detected with the present method. Finally, the inventive test method may be useful for process optimization: Hermeticity tests are a great help to optimize sealing processes.

The selection of a sealing technology for a device requiring a vacuum environment has to be the best compromise between the demands for low cost, high reliability, device thickness, robustness for handling and packaging, outgassing, control of bond material flow, tolerated sealing temperature, chemical material compliance, damping pressure, sensitivity to surface defects and contamination and to surface topography. The bond technology may also affect the electrical performance of the in device, e.g. for RF-switches. Besides maintaining vacuum, encapsulation on a wafer level solves the problem of device protection during the wafer dicing operation. The improved robustness of capped devices allows MEMS devices to be handled in existing standard semiconductor backend processes.

In an important embodiment of the present invention, it focuses on hermeticity tests performed on microresonating devices sealed on the wafer level, using eutectic AuSi wafer bonding with integrated thin film getter from SAES getters to produce low-cost and long-term reliable hermetic MEMS packages. However, the results are of a general nature and therefore can be taken to test and optimize all resonating and other devices regardless of the sealing technology used.

BRIEF DESCRIPTION OF THE DRAWINGS

The present invention will be explained partly referring to the attached figures, wherein.

Figure 1:
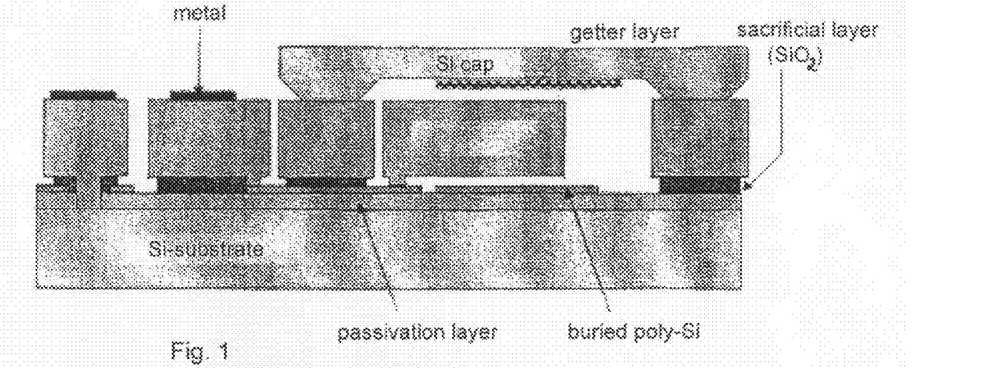
FIG. 1 shows a MEMS construction with getter.

FIG. 1 shows the main functional elements of a conventional surface micromachined MEMS device with a structured getter film in the cap. The effective cavity volume is 260 mL. The structured poly silicon layer is around 10 μm thick.

DETAILED DESCRIPTION OF THE PREFERRED EMBODIMENTS

AuSi eutectic bonding is a technology using eutectic formation at 363° C. between a silicon wafer and gold deposited on another silicon substrate. The bond temperature used is in the range of 380-400° C. This is compatible with Al device metallizations. Due to the liquid formed, this technology tolerates wafer topography coming from previous processing operations. The technology is also compatible with extended outgassing cycles and the activation requirements in case a deposited getter layer is present in the device cavity. Compared to glass frit bonding, AuSi eutectic bonding does not outgas remarkably during the wafer bonding cycle, and requires only very small bondframe widths, typically in the range of 60-100 μm (M. Nese et al., "New method for testing hermeticity of silicon sensor structures", Sensors and Actuators A, 1996, Vol. 53, p. 349-352). This increases the device density on the wafer, which is a major parameter for low-cost production. Therefore, AuSi eutectic bonding is a suitable (although not necessary) technology for the bonding of MEMS to be tested according to the method of the present invention.

Figure 2:
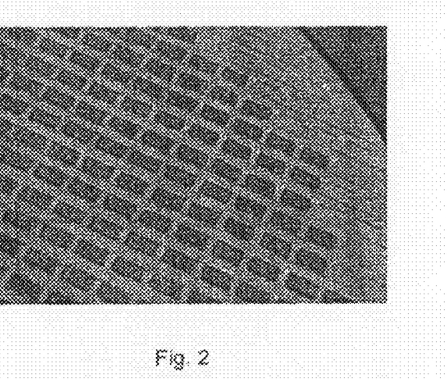
FIG. 2 shows a commercial (PaGeWafer®) cap wafer with deposited getter layers.

The use of Non Evaporable Getter (NEG) material (preferably Zr based alloy) is often required to ensure suitable vacuum (total pressure under $1 \times 10^{-3}$ mbar) and long-term stability in MEMS devices (M. Moraja et al., "Impact of cleaning procedures on getter films", Proceeding of SPIE Vol. 5343 (2004) p. 87-93). NEG can chemically sorb all active gases, including $H_2O$, CO, $CO_2$, $O_2$, $N_2$ and $H_2$. The main constraints imposed by the device design and process are the compatibility of the getter with the fabrication process, the thickness of the getter film and an activation temperature compatible with the bonding process. Besides this, SAES Getters laboratories offer a patterned deposition of the getter material on the cap wafer by a proprietary technology named PaGeWafer®. The thick getter film can be selectively placed into the cavities without affecting the lateral regions of the wafer where the hermetic sealing is to be performed. The typical pattern lateral dimensions are in the range of the millimeter, while the getter film can be placed in the cavities with any depths, ranging from few microns up to hundreds of microns. FIG. 2 shows the precise deposition of the getter material inside the cavities. The getter film consists of a special Zr alloy or the like whose composition is optimized to maximize sorption performance or to maximize performance in specific sealing or bonding processes. Thus, MEMS with integrated NEGs can successfully be tested using the method of the present invention, but, of course, the method is likewise applicable to devices without such NEGs.

Figure 3:
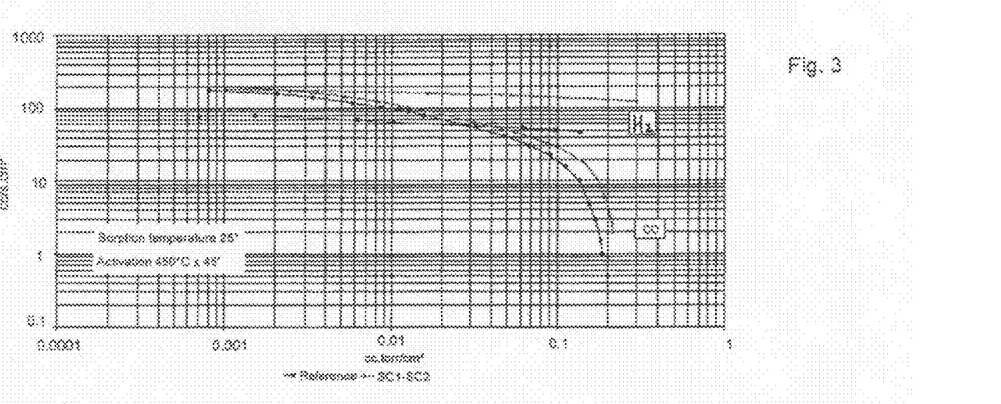
FIG. 3 shows the sorption characteristics for $H_2$ and CO per $cm^2$ of getter film after a SC-1 and SC-2 treatment.

Wafer cleaning of the cap wafer is usually required before bonding to remove organics from the gold bond frames. The getter layer must tolerate the cleaning chemicals. It has been discovered that a caustic chemical treatment of the getter film both cleans the film and enhances its performance without measurable degradation of its structural integrity. For example, caustic chemical treatment called SC1 (with $NH_4OH/H_2O_2/H_2O$) and SC2 (with $HCl/H_2O_2/H_2O$) does not affect the morphology and the sorption capacities of the getter film and significantly increased the sorption capacity, measured after ASTM standard F 798-82 (Wolfgang Reinert, Dr. Dirk Mier, Marten Oldsen, Dr. Peter Merz, "IN-LINE CRITICAL LEAK RATE TESTING OF VACUUM-SEALED AND BACKFILLED RESONATING MEMS DEVICES", 8th international symposium on semiconductor wafer bonding, May 15-20 2005, Quebec). The getter film at wafer level can withstand also treatment with a highly aggressive $HNO_3$ process up to 65% at 120° C. The full compatibility of the getter film towards both temperature and chemical treatment with regards to the activation and capacity of the getter film is demonstrated. Typical absorption speed and absorption capacity of the patterned getter film per unit area at room temperature for hydrogen and carbon monoxide are reported in FIG. 3.

The getter film, if present, is supplied in a stable, passivated form to protect the getter and to ensure that it performs as specified. For example, the PaGeWafer® can be safely handled in clean room air (M. Moraja et al., see above). Once the getter film is in a vacuum or noble gas environment, it needs to be activated. During the thermal activation process, adsorbed gases leave the passive getter surface and the passivation layer is diffused into the bulk, rendering the surface of the getter grains chemically active and ready to pump contaminants out of the MEMS package (Wolfgang Reinert, Dr. Dirk Kähler, Marten Oldsen, Dr. Peter Merz, see above).

The getter film activation can be achieved through three main scenarios: The classic scenario is activation of the getter as part of the wafer bonding process. The temperatures under vacuum reached in the bonding process will simultaneous activate the getter as well as bond the device and cap wafers. In this case, the getter film will also improve the process conditions, by achieving a higher vacuum between the two wafers in the cavity. The second scenario is to apply heat to the cap wafer after bonding. The third scenario is first to heat the cap wafer under vacuum and then to align the wafers and bond them.

To realize a defined gas damping for resonating sensors, a gas-filling procedure has to be established. Only inert gases or gases that do not consume the getter or alter the getter sorption performance may be backfilled in the device cavities.

Figure 4:
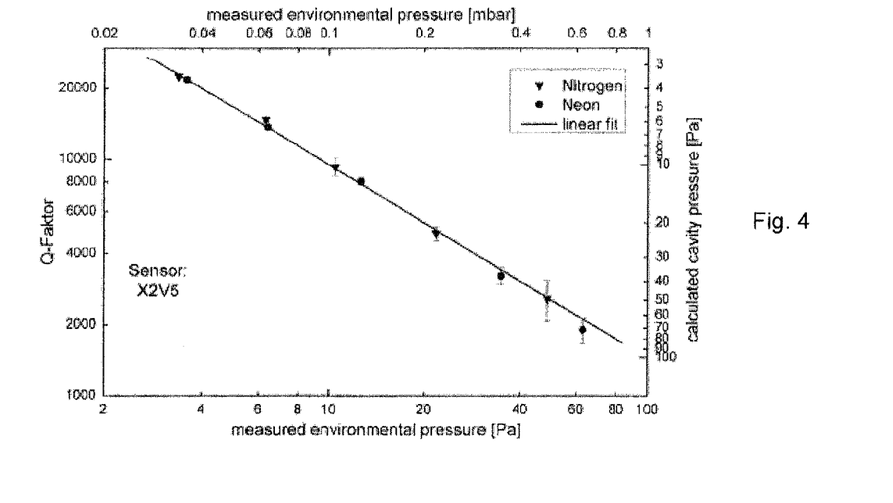
FIG. 4 is a diagram indicating the dependency of the Q-factor versus cavity pressure [N2] for a typical surface micro machined resonator, FIG. 5 indicates the effects degrading the cavity pressure in a MEMS structure.

Argon may be selected because of good damping characteristics and low is outgassing. The backfill operation is typically one step in the wafer bond cycle. FIG. 4 shows the dependency of the device Q-factor from cavity pressure for a typical yaw rate sensor. The cavity pressure can be tuned to any value between $10^{-4}$ hPa and 1000 hPa, even overpressure is possible depending on the wafer bonder infrastructure. Typical damping pressures for gyroscopes are in the range of 10 to 100 Pa (0.1 to 1 mbar).

With the so called ring-down method, the quality factors in the range of 1000-500.000 can precisely be measured. The measured quality factor does not give the atmosphere gas composition; merely it is a measure of the total pressure in the device cavity, derived from the damping properties of a resonating ring (measurement of decay curve upon stopping excitation of the resonating ring). The linear fit of the measured Q-factor vs. chamber pressure in FIG. 4 is the basis to calculate the cavity pressure inside a hermetically sealed resonating device of the same layout.

Figure 5:
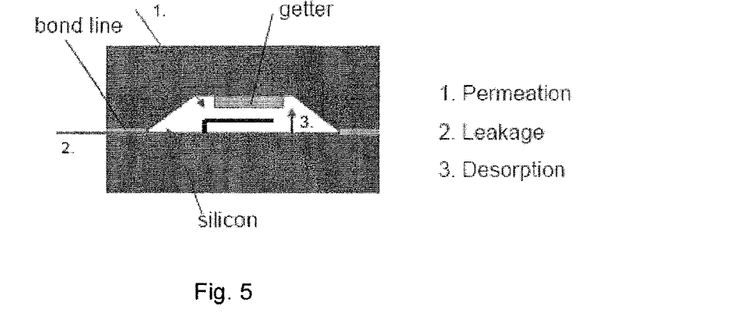

The pressure inside of the vacuum encapsulated devices depends mainly on the outgassing of the inner surfaces, the leakage rate through fine leaks and permeation through the walls, see FIG. 5.

The outgassing depends mainly on the fabrication process of cap and device wafer, which has to be optimized (Max Wutz, Hermann Adam, Wilhelm Walcher, Theorie and Praxis der Vakuumtechnik, 1988, Friedr. Vieweg & Sohn, Braunschweig). For a package encapsulating a hollow space in the range of some to some hundreds of nanoliters ("nL package"), the gas load inside the cavity is critical. The enclosed base pressure together with outgassing during heat up and bonding at peak temperature may be already too much to achieve low cavity pressure below 1 Pa ($10^{-2}$ mbar). But outgassing is a phenomenon that also generates gases throughout the device's lifetime, with decreasing outgassing rate, as the amount of solved gases in surface layers decreases.

Fine leaks arise from imperfect bonding or crack initiation. The pressure change per unit time in a device can be expressed as $$dP/dt = L/V \qquad (1)$$

where L is the leak rate and V the cavity volume of the device. Typical cavity volumes of present devices range from 0.1 mm$^3$ to around 5 mm$^3$ with a clear trend towards decreasing cavity volumes.

Since fine leaks may always be present, a leak test is necessary to guarantee a leakage rate which is small enough, either without the aid of a getter or if compensated by the getter. This maximum allowable leak rate may be called the critical leak rate, as it defines the devices within the statistical cavity pressure distribution that fail the first after the guaranteed lifetime is reached.

As an example: for a device with a life time demand of 15 years and internal vacuum requirement better than 10 Pa (0.1 mbar) and a getter capacity of approximately $1.7 \times 10^{-5}$ hP·l per cavity, equation (1) gives the maximum tolerable air leakage rate at ambient pressure; for a cavity volume of 0.26 mm$^3$ this is $3.6 \times 10^{-14}$ hPa·l/s. Due to the high helium diffusion in silicon dioxide a long-term stable, high vacuum better than $10^{-2}$ Pa ($10^{-4}$ mbar) is very difficult to achieve.

There are a variety of reasons why hermeticity testing is required for MEMS and comparable devices. First, the testing may be needed for screening purposes: Wafer processing may cause statistical surface contaminations or defects that affect the seal integrity just enough to cause shorter lifetimes. Further, dicing, die assembly and transfer molding may also introduce physical defects. Second, a testing may be required for process optimization: Hermeticity tests are a great help to optimize sealing processes.

The present invention is directed to the development of a preferably in-line, ultra-fine leak test, for example on wafer level for resonating and other devices based on the principle to determine the unknown leak conductance of an effective leak by the method described below. This inventive leak test is a method for testing the leakage rate of an encapsulated device, the method comprising bombing the device with a neon or argon atmosphere using a bombing pressure of at least more than environmental pressure and measuring the quality factor before and after bombing.

For example, both lateral and rotational resonating devices can be tested. The leak to rate of every single resonating device can be measured before shipping out. The in-line test is compatible with all existing vacuum wafer bonding technologies (e.g. glass frit bonding, metallic bonding, eutectic bonding, low temperature bonding and anodic bonding), and reactive and thin film sealing as well as transfer cap sealing technology. The test is not affected by the material selection of the device wafer. Lateral and vertical feed throughs are tolerated; even wireless resonator driving concepts in burst or constant driving mode are possible. The method of the present invention does not require any specific device sealing technologies, but is applicable independent of the sealing method. The single devices or MEMS tested with the present method are not affected by leaking neighbour devices. The method may be performed on the devices at any time as required or desired, and consequently there is no wait time effect before measurement. Thus, the present invention provides a fast feedback, e.g. for wafer bonding process control.

For determination of leak conductance, the following is to be considered: In principle, the number and geometry of fine leak channels in a leaking device is not known. It is convenient to sum up all physical leak channels and to treat them as one single effective leak channel. During the neon (or argon) bombing, the device will take up neon (or argon) gas through this effective leak. The molecular gas flow law describes the neon gas flow into the evacuated cavity:

$$q_{gas} = L_{gas} \cdot (P_2 - P_1) \qquad (2)$$

$$L_{gas} = 8/3 \cdot \frac{r^3}{l} \cdot \sqrt{\frac{T}{M_{gas}}} \qquad (3)$$

The conductance $L_{gas}$ is proportional to a geometry term $8/3 \; r^3/l$, that describes the probability of a gas molecule to pass a straight leak channel with opening radius r and length l. The gas with the molecular weight $M_{gas}$ passes the leak channel at temperature T with diffuse reflection after hitting the channel wall. The condition is that the gas does not chemically react with the channel walls. The outside partial gas pressure is given by P2 and the cavity pressure is P1.

The geometry term is experimentally determined by the neon (or argon) bombing. From the monitored pressure increase $\Delta P$ in the device cavity volume V during the bombing at bombing pressure $P_{bomb}$ for the time t, the conductance can be calculated by the equation:

$$L_{gas} = \frac{\Delta P \cdot V}{t \cdot P_{bomb}} \qquad (4)$$

With the known conductance of the leak channel for neon (or argon), the total gas flow for all air gases can be calculated by the sum of all partial flow rates. This assumes that all gas atoms in the air are small enough to pass the leak channel. The calculation can be approximated by taking the mean atom weight of air: $M_{air}$=28.92 g/mol. From vacuum physics (Max Wutz, Hermann Adam, Wilhelm Walcher, see above), the conductance of air is calculated by:

$$L_{air} = L_{Ne} \cdot \sqrt{\frac{M_{Ne}}{M_{air}}} = L_{Ne} \cdot 0.8316 \tag{5}$$

$$q_{air} = L_{air} \cdot P_{air} \tag{6}$$

With the present invention, an air leak rate sensitivity of up to about $10^{-16}$ mbar l/s is detectable.

The ultra-fine leak test of the present invention overcomes the limitations of He and $Kr^{85}$ fine leak testing. Neon has a small collision diameter and high particle velocity. Moreover, it has much lower solubility in $SiO_2$ than He. The sensitivity of the He fine leak test is limited by the capabilities of the mass spectrometer used. Typically, the sensitivity is up to $10^{-9}$ hPa·l/s, which is a factor of 100.000 below the necessary sensitivity to assess the hermeticity of modern inertial sensors. The He test can be performed on single devices or in batch mode, but is ineffective for device cavity volumes below 5 $mm^3$. The $Kr^{85}$ of the radioisotope method requires a long bombing time to achieve a leak rate sensitivity around $10^{-12}$ hPa·l/s, the high cost of test equipment and the interference during scintillator measurements of neighbouring devices on a wafer. Not to forget, both test methods have to be performed with an additional gross leak test to check for rough seal defects.

Figure 6:
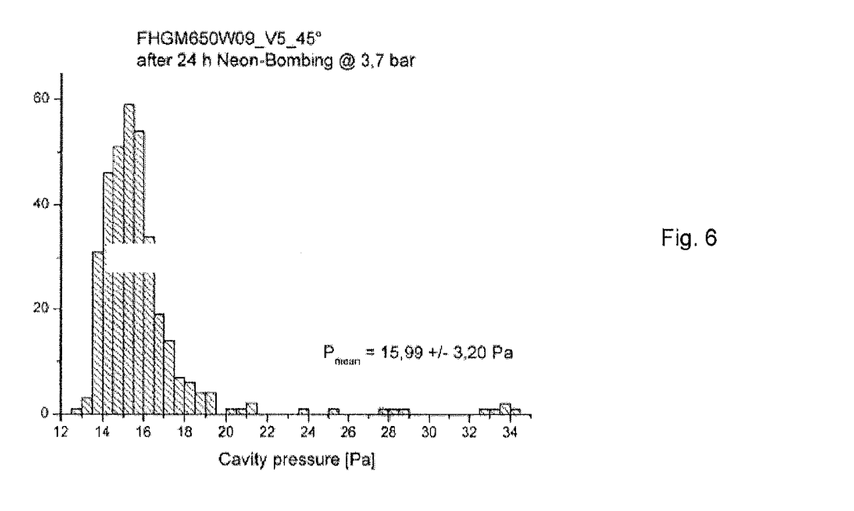
FIG. 6 shows the pressure distribution after neon bombing, FIG. 7 gives the initial air leak rate for gyroscope sensors.
Figure 7:
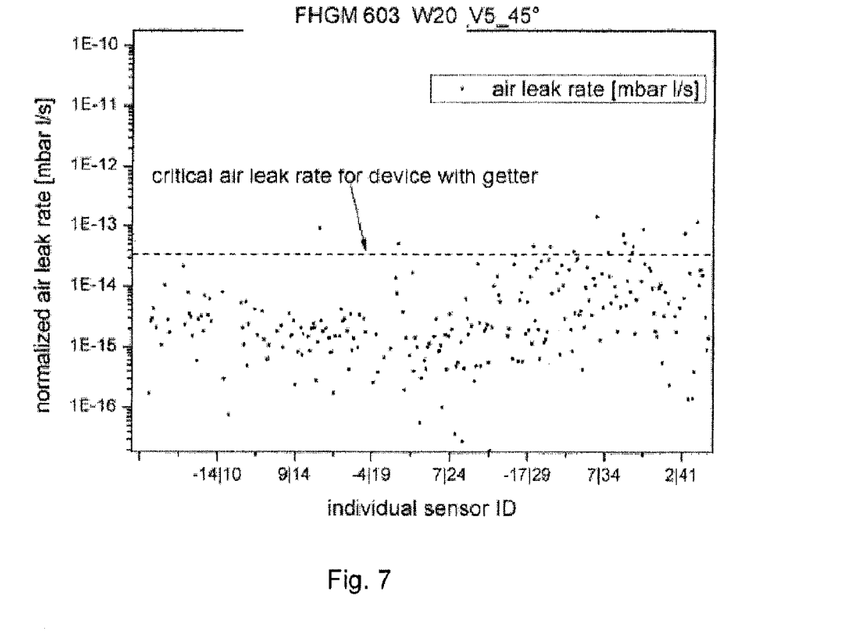

The neon (or argon) ultra-fine leak test of the present invention is based on high pressure bombing in a neon (or argon) atmosphere and the measurement of the quality factor before and after the bombing. The test can be performed on single MEMS devices either encapsulated on a wafer level or in discrete hermetic housings. It can also be used with a batch of devices or on the wafer level, which is the most efficient form to reduce handling efforts. Automatic wafer probers may be used for testing after device sealing. From the electrical measurements, the actual cavity pressure and initial air leak rate can be directly computed and compared to a predefined acceptable air leak rate, see FIGS. 6 and 7.

Figure 8:
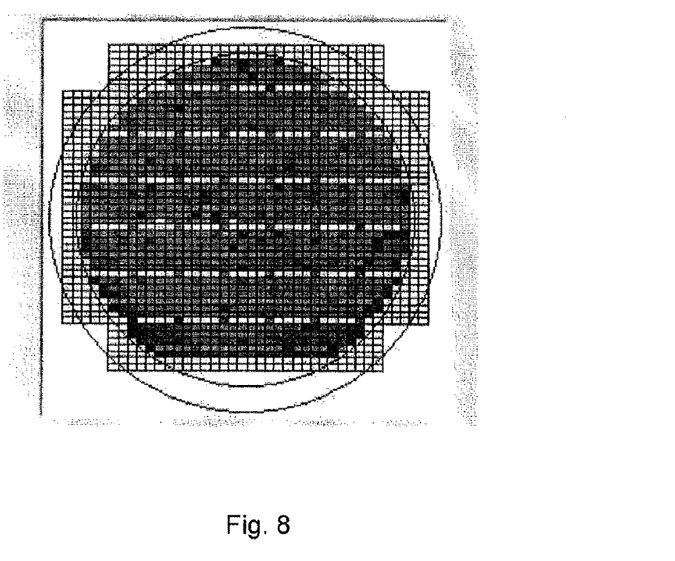
FIG. 8 is a wafermap example wherein 1020 dies of different quality are arranged. With the quality inspection using the present invention, 94% good dies (grey) are discovered, the remaining are to be aborted.

Either by electronic mapping or device inking, the devices with too short lifetime expectation are marked, see FIG. 8. Other than with He or $Kr^{85}$ test, no further gross leak test has to be performed to verify the measured leak rate. This is a very important advantage of the present invention.

Concerning the characteristics of the neon ultra-fine leak test, it is to be noted that the test procedure is compatible with integrated getter films. The use of inert-gas is mandatory for the test as all other active air gases will be gettered and do not increase the cavity pressure. The new in-line ultra-fine leak test is not affected by the typically very small cavity volumes. Other than with all existing fine leak tests, the sensitivity of the test increases with decreasing cavity volume, as the pressure increase during the neon exposure is larger in a smaller cavity for a given leak rate. It should be noted that on the other hand also the critical acceptable leak-rate will decrease to the same amount the cavity volume shrinks, if the device lifetime is constant. The test is not limiting the lateral size and pitch of devices on a wafer. Only the ability to access the bond pad locations with a needle prober is required. The Q-factor measurement of every single device is highly selective and not affected by leaking neighboring devices. The neon tracer gas is selected to achieve a high leak penetration rate but on the other side prevent permeation through the wall materials of hermetic devices. Helium as a tracer gas causes the wrong leak rate measurements, since the diffusion of helium in fused silica even at room temperature is around a factor of 1000 higher than for neon. Experiments with helium bombing show a Q-factor decrease of all hermetically bonded devices by helium uptake, that can be verified by residual gas analysis. On the other side, the use of argon or any other heavier inert gas will decrease the test performance due to the much smaller diffusion rates of these gases in nano-size leak channels, e.g. 40% longer bombing time is necessary if argon is used.

Therefore, in the case of argon as the bombing gas, it is preferred to use higher bombing temperatures for compensating the lower diffusion rate thereof. However, use of neon as the bombing gas is preferred, due to its properties as outlined above, and because its uptake during a bombing is not that harmful for the device's lifespan for argon uptake.

Of course, a mixture of neon and argon may be used for the method of the present invention, if required or desired e.g. for specific purposes, provided that either the ratio of the components of the mixture and/or the partial pressures of the single gases in the mixture are known.

The necessary bombing parameters (gas, time, pressure, temperature) for devices depending on their initial cavity pressure, requested pressure stability over lifetime, backfill gas, getter capacity, getter pre-saturation during bonding, cavity volume, operating lifetime at mean temperature, storage lifetime at mean temperature can be calculated. In principle, bombing times between 1 and up to 100 hours or even more should be contemplated, depending on temperature (usually <50° or even cooled conditions for neon, e.g. down to liquid nitrogen (77K), about room temperature or even heated (for argon) and pressure conditions. Usually, a bombing duration of about 24 hours will be sufficient for testing the pressure stability of the device for an intended life duration of about 15 years.

Example

Figure 9:
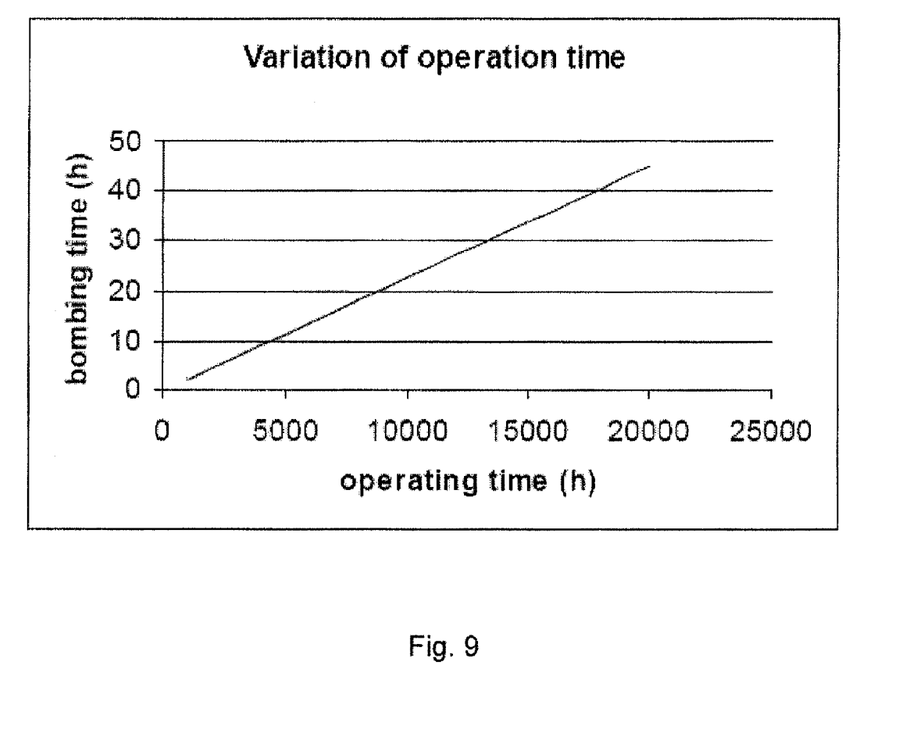
FIG. 9 is a diagram indicating the calculated relationship between bombing time and reliable operation time.

With a bombing time of 30 h in neon at 3 bar absolute pressure, devices with maximum allowable critical leak rates in the range of $10^{-14}$ hPa·l/s will be identified with a sensitivity demand of the quality measurement corresponding to $10^{-2}$ hPa pressure change. As the gas flow through a very small leak from a region of high pressure to a reservoir of very low pressure is based on the molecular flow condition, the gas flow is proportional to $(T/M)^{1/2}$, where T is the gas temperature [K] and M is the molecular mass [g/mol]. FIG. 9 shows the impact of an extended operation time at the maximum operation temperature of the device described in this paper. The sensitivity requirements for the identification of the initial leak rate can only be met by harsher bombing conditions.

In summary, a new in-line ultra-fine leak test has been shown to be very efficient for 100% fine leak testing on resonating gyroscope sensors with integrated getter film (M. Moraja et al., see above). The test is performed e.g. on the wafer level and was evaluated for AuSi eutectic vacuum wafer bonded 6" silicon wafers with a chip density of more than 1600 sensor devices per wafer. The measured leak rate states the 0h hermeticity of the tested devices and does not guarantee the stability of the leak during aging. The influence of device aging on the leak rate may be investigated separately by the use of the same neon ultra-fine leak test.

The invention claimed is:

1. A method for testing the leakage rate of an encapsulated device having a device cavity of below 5 mm$^3$ and including a microresonating structure, comprising the steps of:
   (a) bombing the device with a neon or argon atmosphere using a bombing pressure of at least more than environmental pressure;
   (b) measuring the quality factor of the microresonating structure before and after bombing, wherein the measurement of the quality factor is performed by measuring the damping properties of the resonating structure within the encapsulated device ("ring-down method"); and
   (c) calculating a cavity pressure before and after bombing from the measurement according to (b), wherein a decrease in the quality factor indicates a leakage.

2. A method according to claim 1, wherein the bombing time is about 10 to 100 hours.

3. A method according to claim 1 or 2, wherein the bombing pressure is 1.5 to 100 bar.

4. A method according to claim 3, wherein the bombing pressure is 1.5 to 5 bar.

5. A method according to claim 4, wherein the bombing pressure is 3 to 4 bar.

6. A method according to claim 1, wherein the bombing is performed at a temperature below 50° C.

7. A method according to claim 1, wherein the bombing is performed in an argon atmosphere and the temperature is between room temperature and 330° C.

8. A method according to claim 1, wherein the encapsulated device is a vacuum encapsulated device.

9. A method according to claim 1, wherein the device has been encapsulated under cavity pressures of between about 10$^4$ to 1000 mbar.

10. A method according to claim 1, wherein the device has been encapsulated under environmental pressure or overpressure.

11. A method according to claim 1, wherein the bombing is performed with a plurality of devices in a batch-wise mode.

12. A method according to claim 1, wherein the device is bombed with a neon atmosphere.

13. A method according to claim 1, wherein said change is a reduction in the quality factor.

14. A method according to claim 1, wherein the encapsulated device including a microresonating structure was sealed and is tested for its leakage rate both on wafer level.

15. A method according to claim 14, wherein the encapsulated device includes a silicon substrate and silica materials.

16. A method of claim 1, wherein the encapsulated device includes a silicon substrate and silica materials.

17. A method for identifying a leaking encapsulated device including a microresonating structure comprising the steps of:
   (a) bombing the device with a neon or argon atmosphere using a bombing pressure of at least more than environmental pressure;
   (b) measuring the quality factor before and after bombing, wherein measurement of the quality factor is performed by measuring the damping properties of the resonating structure within the encapsulated device ("ring-down method");
   (c) calculating a cavity pressure before and after bombing from the measurement according to (b), and determining whether said device leaks by comparing the cavity pressure before and after bombing.

18. A method of identifying encapsulated devices including microresonating structures that are not sufficiently tight to provide an expectation of a service life time of 5 to 15 years comprising the steps of:
   (a) bombing the devices with a neon or argon atmosphere using a bombing pressure of at least more than environmental pressure and a bombing duration of about 24 hours;
   (b) measuring the quality factor before and after bombing, wherein measurement of the quality factor is performed by measuring the damping properties of the resonating structure within the encapsulated device ("ring-down method");
   (c) calculating a cavity pressure before and after bombing from the measurement according to (b), and determining whether said devices are sufficiently tight by comparing the cavity pressure before and after bombing, wherein an increase in the cavity pressure of more than 1% after said bombing indicates that said encapsulated devices are not sufficiently tight to provide a service life time of 5 to 15 years.

19. A method according to claim 18, wherein said change is a reduction in the quality factor.

20. A method of detecting damage to devices that have encapsulated microresonating structures, the method comprising the steps of:
   (a) bombing the devices with a neon or argon atmosphere using a bombing pressure of at least more than environmental pressure;
   (b) measuring the quality factor before and after bombing, wherein measurement of the quality factor is performed by measuring the damping properties of the resonating structure within the encapsulated device ("ring-down method");
   (c) calculating a cavity pressure before and after bombing from the measurement according to (b), and determining whether said devices are damaged by comparing the cavity pressure before and after bombing.

* * * * *